United States Patent [19]

Athearn

[11] 4,324,847
[45] Apr. 13, 1982

[54] LITHIUM ANODE ASSEMBLIES AND CELL CONSTRUCTION

[75] Inventor: Lee F. Athearn, Fridley, Minn.
[73] Assignee: Medtronic, Inc., Minneapolis, Minn.
[21] Appl. No.: 188,512
[22] Filed: Sep. 18, 1980
[51] Int. Cl.³ .............................................. H01M 4/76
[52] U.S. Cl. ................................... 429/181; 429/218
[58] Field of Search ............... 429/174, 191, 181, 218, 429/101

[56] References Cited
U.S. PATENT DOCUMENTS

| | | |
|---|---|---|
| 3,817,791 | 1/1973 | Greatbatch et al. .............. 136/83 R |
| 3,874,929 | 4/1975 | Greatbatch ........................ 429/174 |
| 3,969,143 | 7/1976 | Mead et al. ....................... 136/83 R |
| 4,105,833 | 8/1978 | Greatbatch et al. ............... 429/104 |
| 4,117,212 | 7/1978 | Mead et al. ....................... 429/153 |
| 4,128,703 | 12/1978 | Mead et al. ....................... 429/101 |
| 4,132,836 | 1/1979 | Greatbatch ......................... 429/91 |
| 4,135,519 | 1/1979 | Greatbatch ................... 128/419 PS |

*Primary Examiner*—Donald L. Walton
*Attorney, Agent, or Firm*—Schroeder, Siegfried, Vidas, Steffey & Arrett

[57] ABSTRACT

Band with metallized surface area for peripherally framing lithium anodes.

19 Claims, 2 Drawing Figures

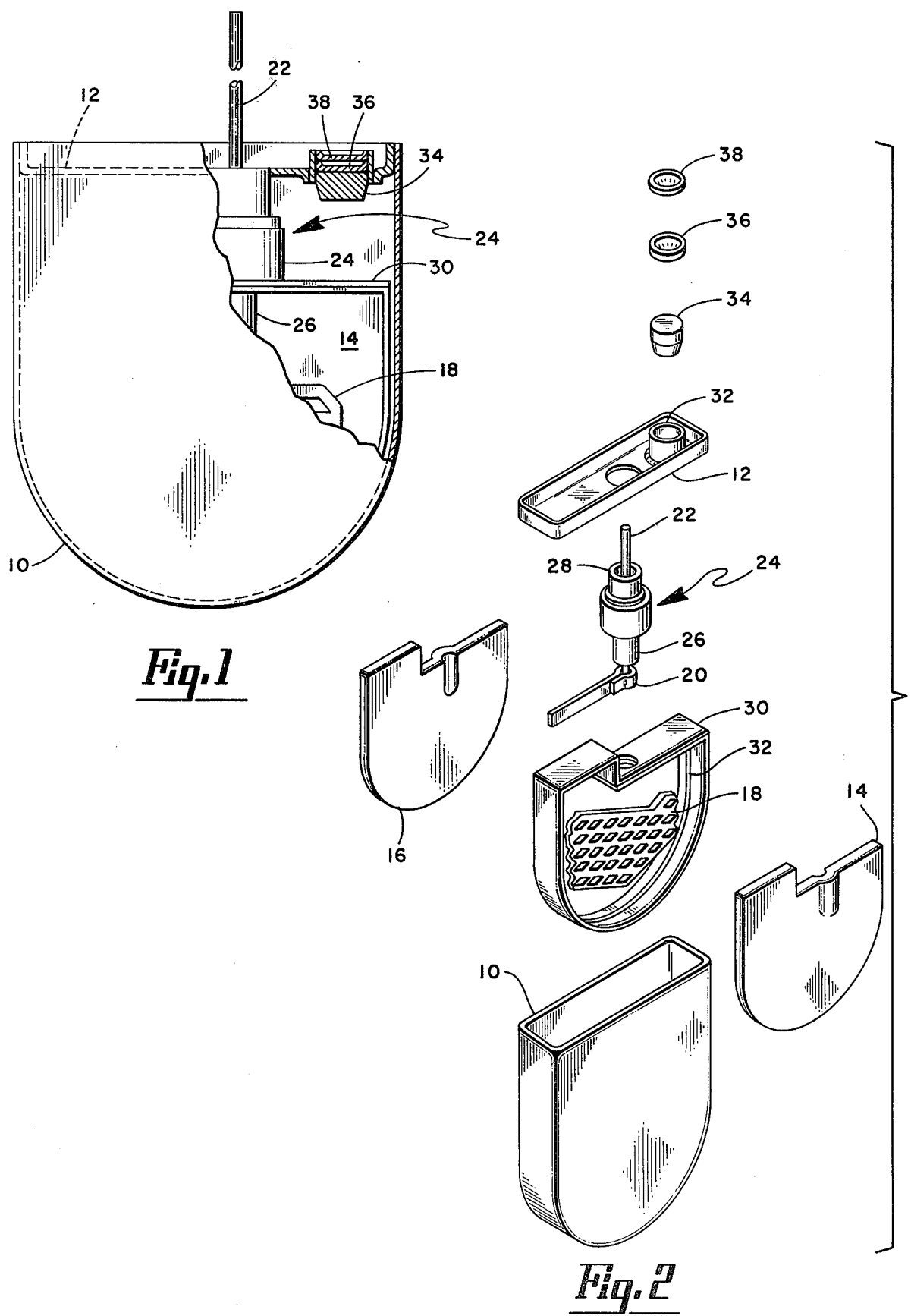

LITHIUM ANODE ASSEMBLIES AND CELL CONSTRUCTION

DESCRIPTION

Background of Prior Art

This invention relates to lithium anode assemblies and to electrochemical cells incorporating such anode assemblies.

Lithium anode assemblies are used in electrochemical cells, such as batteries, in combination with cathode materials, such as halogen containing cathode materials, which tend to attack protions of the lithium anode assembly Lithium anode assemblies making use of peripheral polymeric bands or frame members are known in the art.

The following listed U.S. Patents show various lithium-halogen batteries or cells making use of such banded lithium anode assemblies: U.S. Pat. Nos. 3,969,143; 4,105,833; 4,132,836; 4,135,519 and 4,128,703, all of which are incorporated herein by reference.

BRIEF SUMMARY OF THE INVENTION

This invention provides an improvement in such banded or framed lithium anode assemblies wherein the band includes a metallized surface area which alloys or bonds readily with the lithium.

BRIEF DESCRIPTION OF THE DRAWINGS

FIG. 1 is a side elevational view of a lithium-halogen cell with parts removed for illustrating the invention;

FIG. 2 is an exploded view of the cell of FIG. 1.

DETAILED DESCRIPTION OF THE INVENTION

Referring now to the Figures, the lithium-halogen cell illustrated comprises a casing 10 of metal such as stainless steel. Casing 10 has an open top or end which is closed by means of a lid 12, also of stainless steel. The cell further includes anode means comprising a pair of lithium elements or plates 14 and 16 having an anode current collector element 18 sandwiched or enclosed therebetween. Current collector 18 is a relatively thin element of nickel or zirconium mesh. A conductor lead 20 of nickel or other suitable metal is spot welded to collectior element 18 and an electrical lead 22 which may be of nickel or other suitable metal is welded at one end to lead 20 and it is of sufficient length to extend out of the casing for making an external electrical connection thereto. Conductor 22 is sealed from the remainder of the cell contents by means including an insulator element generally designated 24 which surrounds lead 22 and has a first protion 26 which is sandwiched between lithium plates 14 and 16 and a second body portion 28 which is cylindrical and located between the lithium plates and lid 12 when the cell is assembled as shown in FIG.1. Insulator 24 is of a material which in addition to being a non-conductor of electricity is also non-reactive with the contents of the cell, such as the halogen cathode materials utilized in the cell illustrated. One form of material found to perform satisfactorily as the fluoropolymers, such as the one available under the Tradename "Halar", a trademark of the Allied Chemical Company. Other non-reactive materials may be used for insulator 24.

The anode assembly comprising the lithium elements 14 and 16 and current collector 18 is fitted within an anode holding or retention means comprised of a peripheral frame member in the form of a band 30 which peripherally encloses the anode assembly leaving the major surface areas of the lithium elements exposed. Band 30 is preferably of the aforementioned fluoropolymer material or any similar material which is non-reactive with the cell contents. In the present illustration, band 30 surrounds the peripheral edges of the lithium elements or plates 14 and 16 engaging the peripheral contact surfaces provided at the joint area therebetween. The opposite ends of band 30 are provided with apertures of a size sufficient to receive the insulator portion 26. These ends are overlapped adjacent the insulator as shown in FIG. 1 to provide a wrap-around structure.

Band 30 includes a metallized surface area 32 (shown in FIG. 2) the purpose of which is to bond to the lithium elements thereby sealing band 30 thereto. When the lithium anode assembly makes use of joined lithium elements such as 14 and 16 the metallized surface area seals the joint therebetween protecting the enclosed collector 18 from attack by the cell contents. In bonding to the lithium anode, the metallized surface area also securely retains the lithium anode within band 30.

Metallized area 32 may be formed by any metal which alloys readily at room temperature with lithium, such as aluminum, silver, magnesium, copper or lead. It is further required that such metals be metallizable, that is readily formed on the surface of band 30 by such means as vapor desposition, electroplating or solvent deposition. The thickness of the metallized surface area is not critical. One to two microns have been found acceptable. The metallized surface need not cover the entire area of band 30 and may merely cover a central peripherally extending portion as shown in FIG. 2. In actual practice, on a band 30 having a width of ¼ inch, a metallized area of 0.080–0.100 width was found satisfactory for sealing and retaining lithium anode elements.

In an illustrative method of forming the anode assembly, first a subassembly including lead 22 within insulator 24 is provided. Band 30 with a metallized surface area 32 is then assembled into place with the ends overlapped to align the openings therein which then are fitted onto insulator portion 28. The overlapping ends joined to insulator portion 28 can be sealed in place with a suitable cement which is non-reactive with cell contents, such as a cyanoacrylate cement commercially available as Permabond 101. Current collector 18, conducting strip 20 and the end of lead 22 are spot welded together whereupon the lithium plates 14 and 16 are positioned within band 30 on opposite sides of the collector element 18 and insulator portion 26. The subassembly then is placed within a suitable fixture or support and is pressed together with a suitable force, for example about 3000 pounds. The collector 18, strip 20, insulator portion 26 and the portion of lead 22 contained therein are sealed within the lithium elements 14 and 16 due to the bonding or alloying which immediately takes place between the lithium and the metallized surface area on band 30 with the result that the peripheral juncture at the edges of the lithium elements 14 and 16 is enclosed and sealed by band 30. The completed anode assembly thus has two operative, exposed electrode surfaces which are oppositely directed or disposed.

When the anode assembly is completed, it may be provided with organic electron donor coatings as is known in the art and then positioned in casing 10 as shown in FIG. 1 with the anode operative surfaces spaced from the inner surface of the casing. Lid 12 is then welded to casing 10. This is important in this particular embodiment since casing 10 is the current collector for the cathode. In this embodiment it is also important that the metallized surface area not extend to the edges of band 30.

A halogen cathode material such as iodine or bromine contained in an organic donor component material, as is known in the art, may then be poured through a suitable opening 33 in lid 12 to fill casing 10 and operatively contact the exposed surfaces of the lithium anode. For example, a suitable cathode material is prepared by heating the organic material, such as poly (2-vinylpyridine), mixed with iodine, to a temperature greater than crystallization temperature of iodine, for example about 320° F. The amount of iodine should be greater than about 50% by weight of the resulting mixture so that enough iodine is available in the cathode material to provide sufficient conductivity for cell operation. The resulting mixture upon heating may be poured into an empty case 10 when held into an upright position. The amount of constituents and material introduced into the casing is sufficient to contact the lateral surfaces of lithium elements 14, 16 and to reach a level at or adjacent the interior surface of lid 12.

The opening in lid 12 is then hermetically sealed with a series of plugs such as Teflon plug 34, and stainless steel plugs 36 and 38 as shown. The second (upper) stainless steel plug is then welded in place to provide a hermetic seal.

In the particular embodiment illustrated, casing 10 being of electrically conducting material, serves as a cathode current collector in direct contact with the cathodic contents of casing 10. Consequently, an electical lead (not shown) may be attached directly to casing 10 for cathodic contact.

While a preferred embodiment has been described in detail, this has not been done for purposes of limitation but by way of illustration. The invention is intended to be defined by the following claims:

I claim:
1. In a lithium anode assembly for electrochemical cells, the assembly comprising a lithium anode element having generally opposing sides and a peripheral contact surface area extending around the element between the opposing sides; a peripheral frame member comprised of a material non-reactive with the contents of the cell, the frame peripherally contacting and enclosing the anode element at the peripheral contact surface area thereof, the improvement comprising a metallized surface area on the surface of the frame member which contacts the anode element.

2. The lithium anode assembly of claim 1 in which the frame member comprises a band of polymeric material.

3. The lithium anode assembly of claim 2 in which the polymeric material is a fluoropolymer.

4. The lithium anode assembly of claim 2 in which the band is a wrap-around band.

5. The lithium anode assembly of claim 1 in which the metallized surface comprises aluminum.

6. In a lithium anode assembly for an electrochemical cell, the assembly comprising a pair of lithium elements joined together and including a collector element therebetween, the lithium elements being fitted with a peripheral frame member for sealing the joint area therebetween, the improvement comprising a metallized surface area on the surface of the frame member which contacts the lithium elements.

7. The lithium anode assembly of claim 6 in which the frame member comprises a band of polymeric material.

8. The lithium anode assembly of claim 6 in which the polymeric material is a fluoropolymer.

9. The lithium anode assembly of claim 6 in which the metallized surface comprises aluminum.

10. The lithium anode assembly of claim 6 in which the metallized surface area comprises only a central surface area extending along the band.

11. A lithium-halogen cell comprising:
a cell casing;
a lithium anode positioned within the casing and having generally opposing sides and a peripheral contact surface area extending around the element between the opposing sides;
a peripheral frame member comprised of a material non-reactive with the contents of the cell, the frame member peripherally contacting and enclosing the lithium anode at the peripheral contact surface area thereof;
a peripherally extending metallized surface area on the surface of the frame which contacts the lithium anode;
electrical lead means connected to the anode and extending from the casing;
means sealing the lead means from the other contents of the cell;
a halogen containing cathode in said casing and in operative contact with the lithium anode, and
means electrically contacting the cathode.

12. The cell of claim 11 in which the frame member is a band of polymeric material.

13. The cell of claim 12 in which the polymeric material is a fluoropolymer.

14. The cell of claim 12 in which the band is a wrap-around band.

15. The cell of claim 11 in which the metallized surface is comprised of aluminum.

16. The cell of claim 11 in which the lithium anode comprises a pair of lithium elements joined together and including a collector element therebetween, the peripheral frame member contacting and enclosing the lithium elements at the joint area therebetween.

17. The cell of claim 16 in which the frame member comprises a polymeric band.

18. The cell of claim 17 in which the metallized surface area on the band is of aluminum.

19. The cell of claim 18 in which the polymeric band material is a fluoropolymer.

* * * * *

UNITED STATES PATENT AND TRADEMARK OFFICE
CERTIFICATE OF CORRECTION

PATENT NO. : 4,324,847
DATED : April 13, 1982
INVENTOR(S) : Lee F. Athearn

It is certified that error appears in the above–identified patent and that said Letters Patent are hereby corrected as shown below:

Column 1, line 53, the word appearing as "protion" should read --portion--.

Column 1, line 61, the word appearing as "as" should read --are--.

Column 3, line 17, the numeral appearing as "320°" should read --300°--.

Column 3, lines 35, 36, the word appearing as "electical" should read --electrical--.

Signed and Sealed this

Twenty-second Day of June 1982

[SEAL]

Attest:

GERALD J. MOSSINGHOFF

Attesting Officer     Commissioner of Patents and Trademarks